Patented June 3, 1930

1,761,376

UNITED STATES PATENT OFFICE

HANS WALTER, OF MAINZ-MOMBACH, GERMANY, ASSIGNOR TO VEREIN FÜR CHEMISCHE INDUSTRIE AKTIENGESELLSCHAFT, OF FRANKFORT-ON-THE-MAIN, GERMANY, A GERMAN COMPANY

MANUFACTURE OF SANTALOL COMPOUNDS

No Drawing. Original application filed July 15, 1926, Serial No. 122,731, and in Germany July 17, 1925. Divided and this application filed January 3, 1928. Serial No. 244,381.

The invention forming the subject matter of the present application, which is a division of my co-pending application Serial No. 122,731 filed July 15th, 1926, relates to the production of santalol compounds and consists in a process wherein esters of santalol are reacted on with hexamethylenetetramine.

It is known to esterify chemical compounds of alcoholic character with bromacetic acid and then to couple the products with hexamethylenetetramine. Such preparations are soluble in water. In view, however, of the complicated constitution of santalol, which still remains a substantially unexplored product, it was in no way to be foreseen that, by rendering it soluble in water, there would not be other detrimental changes which would impair the therapeutic action of the preparation which plays an important rôle, especially in pharmacy.

It has been found particularly advantageous to use esters derived from halogen fatty acids, as the action in this instance takes place more smoothly and gives a better yield than with other esters.

The reaction itself may be carried out in the presence of a suitable solvent, such as, for example, chloroform, carbon tetrachloride, benzol and the like, or even without a solvent, and at normal or increased temperature.

The following example serves to illustrate how the process may be carried into effect:

Equal molecular weights of santalol ($C_{15}H_{23}OH$) and bromacetyl bromide or chloracetylchloride are treated in a chloroform solution with rather more than the calculated quantity of quinoline. The bromo- or chloro-acetic acid-santalol ester so obtained is treated in the usual manner, washed, dried and allowed to stand in chloroform solution with hexamethylenetetramine. After standing for several hours a white crystalline powder separates out in considerable quantity. The preparation is very soluble in water and has scarcely any bitter taste. The product has probably the following empirical formula:

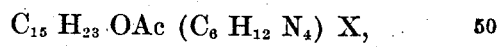

$$C_{15} H_{23} OAc (C_6 H_{12} N_4) X,$$

in which X is either Br or Cl.

It will be evident that the santalol ester of the halogen fatty acid may also be produced, if desired, directly from the halogen fatty acid.

The result obtained by treating santalol according to this invention is astonishing, because in addition to an increased pharmacological action, the irritating effect which accompanied the insolubility in water of the santalol and which represented a very disturbing element in the use thereof, disappears.

What I claim is:

1. A process for the production of santalol compounds, which comprises reacting on santalol esters with hexamethylenetetramine.

2. A process for the production of santalol compounds, which comprises reacting on santalol-halogen fatty acid compounds with hexamethylenetetramine.

3. A process for the production of santalol compounds, which comprises reacting on santalol-halogen fatty acid halide compounds with hexamethylenetetramine.

In testimony whereof I have signed my name this 11th day of December, 1927.
name this 17th day of December, 1927.

Dr. HANS WALTER.